J. M. BALDWIN.
LOCK NUT.
APPLICATION FILED NOV. 5, 1913.
1,120,585. Patented Dec. 8, 1914.
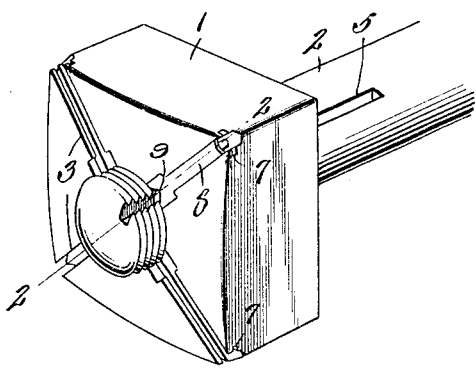
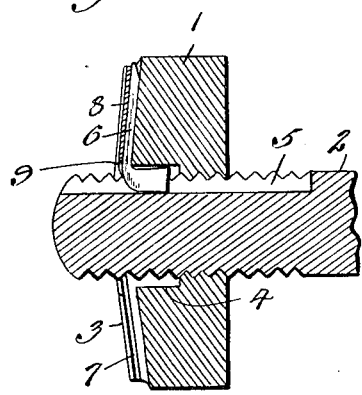
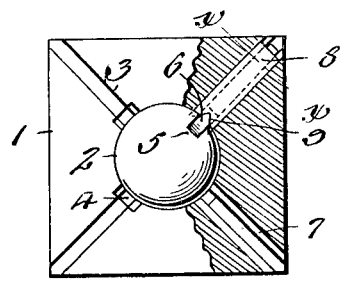
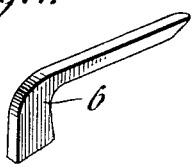
Inventor
J. M. Baldwin,
Witnesses
By Victor J. Evans
Attorney

UNITED STATES PATENT OFFICE.

JOHN M. BALDWIN, OF WILBURTON, OKLAHOMA, ASSIGNOR OF ONE-HALF TO HENRY C. AUSTIN, OF WILBURTON, OKLAHOMA.

LOCK-NUT.

1,120,585.  Specification of Letters Patent.  Patented Dec. 8, 1914.

Application filed November 5, 1913. Serial No. 799,365.

*To all whom it may concern:*

Be it known that I, JOHN M. BALDWIN, a citizen of the United States, residing at Wilburton, in the county of Latimer and State of Oklahoma, have invented new and useful Improvements in Lock-Nuts, of which the following is a specification.

The present invention relates to improvements in nut locks, the object of the same being to provide a new and improved nut lock which is simple and durable in construction, very effective in operation and arranged to securely hold a nut against accidental turning after the nut is screwed home upon the bolt to the desired position.

The invention consists in the construction, arrangement and novel combination of parts set forth in the following specification and falling within the scope of the appended claims.

In the drawing: Figure 1 is a perspective view of the improvement, Fig. 2 is a sectional view on the line 2—2 of Fig. 1, Fig. 3 is a plan view looking toward the outer face of the nut, parts of the nut being broken away and shown in section, Fig. 4 is a detail perspective view of the locking member, Fig. 5 is a similar view of the cover, and Fig. 6 is a transverse section on the line $x$—$x$ of Fig. 3.

The nut 1 which is screwed upon the bolt 2 is formed upon its outer face and at its corners with slots 3 which communicate with the bore of the nut. These slots are comparatively deep and communicate with depressions 4 arranged right angularly of the slots within the threaded bore of the nut. The depressed portions terminate a suitable distance from the outer face of the nut, so that the said bore is provided with a sufficient number of continuous threads as to insure the strength thereof regardless of the interrupted threads provided by the depressions 4.

The threaded shank of the bolt 2 is provided with a longitudinally arranged channel or key-way 5 which is adapted to receive one of the arms of a substantially L-shaped key 6, the said arm being also received within one of the depressions 4 of the nut, and its second angular arm being received within one of the slots 3. The opposite walls of the slots 3, adjacent the outer face of the nut are provided with alining depressions forming ways 7 for the reception of the opposite longitudinal edges of a cover 8. The cover 8 is constructed of spring metal, and is preferably arch-shaped in cross section, and has one of its ends incut in the form of a V as indicated by the numeral 9. The cover is, of course, of a greater width than the distance between the walls provided by the oppositely disposed pairs of ways 7, so that it is necessary to compress the longitudinal edges of the cross sectionally arched or rounded cover to permit of the same being inserted within the rails, and when the cover is fully inserted within the ways its V-shaped ends 9 will engage within the threads of the bolt 2 opposite the key-way 5 of the bolt, thus providing a space or passage for the reception of an instrument whereby the said key may be removed from its overlying and contacting position with one of the angular arms of the key 6 to permit of the withdrawal of the said key. The tension exerted by the opposite edges of the key is sufficient to effectively retain the key within the ways, and from the above description, taken in connection within the accompanying drawing the simplicity of the device as well as the advantages thereof will, it is thought, be perfectly apparent to those skilled in the art to which such inventions appertain without further detailed description.

Having thus described the invention, what I claim as new is:

1. A nut lock having a nut formed with a slot upon one of its faces which communicates with an angularly disposed depression provided in the bore of the nut, the bolt for the nut having a channel which is adapted to register with the depression, an angular key having its bit arranged within the registering depression and channel and its offset portion disposed within the slot, the opposite walls of the slot being formed with ways, a cross sectionally arch-shaped spring member adapted to be arranged within the ways, said spring member overlying the angular portion of the key and having its inner edge engaging with the threads of the bolt.

2. In a nut lock, a nut having one of its faces formed with a slot which is arranged at an angle from one of its corners to its bore, the side walls provided by the slot being centrally formed with longitudinally extending depressions forming ways, the nut being provided with a longitudinal depression which enters its bore and the groove upon the face of the nut, a nut for the bolt having a channel adapted to register with the depression in the nut, a key having its bit arranged within the channel of the bolt and the depression of the nut and its shank arranged within the opening of the nut, a cross sectionally arched spring member adapted to be passed within the ways in the side walls of the groove to retain the shank of the key within the groove, the said cross sectionally arched spring member having one of its ends incut substantially in the form of a V, and the pointed ends thus provided adapted to engage between two of the threads of the bolt.

In testimony whereof I affix my signature in presence of two witnesses.

JOHN M. BALDWIN.

Witnesses:
 WINFRED BRAZIL,
 E. L. MALONE.

Copies of this patent may be obtained for five cents each, by addressing the "Commissioner of Patents. Washington, D. C."